Sept. 17, 1968      D. D. NORWOOD      3,402,161
POLYMERIZATION OF OLEFINS UTILIZING 2-NONAGITATED REACTION ZONES
Filed Oct. 7, 1963
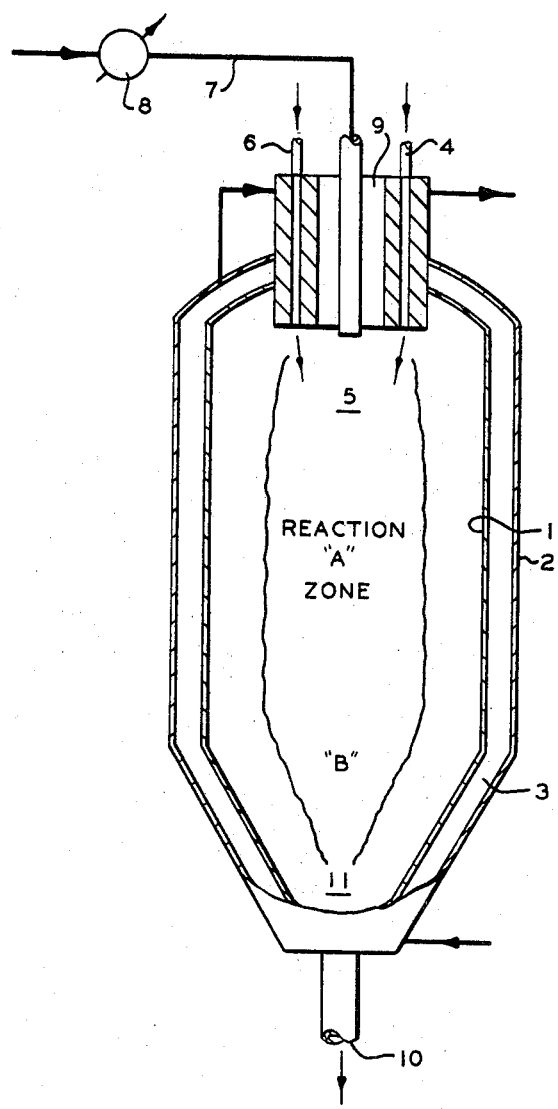
INVENTOR.
D. D. NORWOOD
BY *Young & Quigg*
ATTORNEYS

United States Patent Office 3,402,161
Patented Sept. 17, 1968

3,402,161
POLYMERIZATION OF OLEFINS UTILIZING 2-NONAGITATED REACTION ZONES
Donald D. Norwood, Bartlesville, Okla., assignor to Phillips Petroleum Company, a corporation of Delaware
Filed Oct. 7, 1963, Ser. No. 314,361
2 Claims. (Cl. 260—94.2)

ABSTRACT OF THE DISCLOSURE

Polymerization process for the formation of diene polymers wherein gel formation is avoided in the reaction system by carrying the process in a nonagitated reactor having a high and low temperature zone therein and wherein the reaction mass is confined by a zone having a temperature differential of at least 40° F.

---

This invention relates to an improved method for the production of polymers of olefins. In one aspect, this invention relates to a method for the polymerization of olefinic compounds which avoids plugging of the reactor by gel buildup during the polymer formation. In a further aspect, the invention relates to a novel process and apparatus for the formation of polymers of conjugated dienes in the presence of an oganometallic catalyst.

The polymerization of olefinic compounds such as conjugated dienes, for example butadiene, with an organolithium compound such as n-butyllithium is known. However, many polymers of such conjugated dienes prepared in the presence of an organolithium initiator have a tendency to form a gel, necessitating shutdown of the operation so that the gelatinous material can be removed from the reactor. Operation under such conditions results in the overall process being economically unattractive. Thus, there is a need for a method of continuous polymerization of conjugated dienes with organolithium initiators which avoids the formation of gel in the reactor or which at least reduces the buildup of gel significantly in order to avoid plugging of the reactor and subsequent shutdown of the system.

In accordance with my invention, I have now discovered that by operating under certain conditions in the reaction zone, the formation of gel, or at least plugging by gel of the polymerization system, is avoided.

More specifically, I have discovered that conjugated diene polymers are formed substantially free of gel in the presence of organolithium initiators by carrying out the polymerization reaction in a chilled surface settling polymerization zone.

Accordingly, it is an object of this invention to provide a process for the production of polymers whereby gel formation is minimized. Another object of the invention is to provide a process for the production of polymers of conjugated dienes whereby the gel buildup is minimized. Another object of the invention is to provide novel apparatus for conducting the polymerization of conjugated dienes with a minimum of gel formation or buildup.

Other objects, advantages and features of my invention will be readily apparent to those skilled in the art from a study of the disclosure, the drawing and the appended claims.

In the polymerization of many organic compounds, the resulting polymer has a tendency to come out of solution and thereby form a coating in the system wherein the polymer is being formed. This problem is particularly acute where organolithium polymerization of conjugated dienes is carried out in a continuous manner. It has been extremely difficult heretofore, if not impossible, to avoid some gel formation in the continuous reactors. While this gel formation represents only a small portion of the polymer being produced, accumulation or buildup of gel on the reactor walls or other surfaces in contact with the reaction mass becomes a serious operating problem and eventually causes shutdown of the system for its removal.

By conducting the polymerization in a chilled surface settling polymerization zone in accordance with this invention, accumulation of gel is avoided so that plugging of the overall polymerization system is either completely eliminated or substantially reduced.

The invention will be better understood by reference to the drawing which illustrates diagrammatically a chilled surface settling polymerization reactor suitable for use in the inventive process. It is not intended, however, that the invention be limited thereto.

Referring now to the drawing, high temperature polymerization reactor 1 is so provided with jacket 2 to form annulus 3 wherein a relatively cool coolant solution is circulated. Diene monomer is introduced via conduit 4 to the high temperature reaction zone 5. Organolithium initiator is introduced via conduit 6 into the reaction zone 5. Initiation temperature to start the exothermic polymerization is obtained by preheating the solvent in heater 8 and thereafter introducing the solvent into the reactor 1 through conduit 7. Hot solvent introduction into 1 via conduit 7 is insulated from the reactants by means of a "dead air" annulus 9. By regulating the heat applied to the solvent by heater 8, the polymerization zone temperature is kept under control. When polymerization equilibrium is established in reaction zone 5, polymer solids dissolve as they migrate into the low temperature zone 11 of reactor 1, which is established by circulation of coolant in annulus 3, thereby chilling the inner surface of the walls of the reactor. The establishment of a chilled surface on the reactor walls thus prevents buildup of solid polymer on the walls. This is due to a high temperature solubility "turnover" or inversion wherein polymer will precipitate out of solution. In a non-agitated system, I have found that polymer solids will precipitate due to the localized high temperatures. The particles appear to be salted-out type solids and will disappear completely when chilled.

As the gel particles grow, they tend to settle out of solution. Since the gel particles are slightly more dense than the polymer solution, they settle out when no mechanical agitation is supplied. By introducing the feed streams 4, 6 and 7 overhead as illustrated, advantage is taken of this phenomenon. By maintaining the walls of reactor 1 at a temperature of about 40° below that of the reaction mass and preferably at an average maximum temperature of 100° to 140° F., which is below the initiation temperature of the polymerization reaction, polymerization of the conjugated diene on the reactor walls is prevented. Generally, a coolant having a temperature of 90° to 120° F. is adequate to maintain the surface of the reactor in contact with the reaction mass at the desired temperature level. Since the gel molecules which form tend to settle out of solution as they decrease in size, by utilizing flow rates which allow only minimum residence time in the high temperature reaction zone 5, followed by removal of the reaction mass continuously through the lower end of the reactor via conduit 10, the extent of monomer conversion is controlled by reactor design, flow rates of reactants, and reaction zone temperature control. If monomer escaping polymerization in the reaction zone does not redissolve in the area confined by the chilled surfaces of the reactor, a reflux condenser can be added at the high point of the reactor for return of the monomer to the reaction zone. Any gel particles which form settle into the inverted conical floor of reactor 1 and entrain with the viscous solution product.

Although not required, mixing means can be inserted in the upper end of the reactor in the vicinity of the reactant inlets. Alternatively, mixing of the monomer, solvent and catalyst can be achieved by jet mixing of the compounds as they are initially introduced into the reactor.

The following example will serve further to illustrate the invention.

Example

Organolithium-catalyzed polymerization of butadiene was conducted in a continuous, non-agitated reactor system having a residence time of one hour under the following conditions:

Feed: Solvent (n-hexane), diene (butadiene)

| | |
|---|---:|
| lbs./SD | 742,184 |
| Catalyst n-butyllithium _____lbs./SD | 158 |
| Reactor temperature _____° F | 260–290 |
| Reactor surface temperature _____° F | 90–140 |
| Polymer product _____lbs./SD | 89,120 |

Upon shutdown of the reaction, the reactor was examined. No gel accumulation was found on the reactor surfaces which were in contact with the reaction mass.

By operating in accordance with the inventive polymerization system, several advantages are achieved. A continuous polymerization reaction is operable without gel buildup or accumulation on or within the reactor. The system allows for reaction zone temperatures to be employed which result in maximum polymerization rates. The system also allows for operation with a high solids (weight ratio of polymer to solvent) content without shutdown due to plugging. Also, the necessity of providing mechanical agitation of the reactor is avoided thereby permitting a relatively low-cost polymerization system.

While the invention has been illustrated by the polymerization of butadiene with n-butyllithium as a catalyst, it is not intended to be limited thereto. Thus any polymerizable diene having 4 to 10 carbon atoms such as is suitable for use in this invention and any organo metal or organo metal-metal halide catalyst systems can be employed. Such systems include the mixture tri-isobutyl aluminum-titanium tetrachloride, tri-isobutyl aluminum-titanium trichloride and titanium tetrachloride, and the like.

Various modifications are possible within the foregoing disclosure without departing from the spirit or scope thereof.

I claim:
1. A continuous process for the polymerization of a polymerizable diene having 4 to 10 carbon atoms in the presence of an organo metal catalyst therein which comprises the steps of
    (a) preheating a diluent to initiation temperature;
    (b) thereafter introducing said diene, catalyst and said preheated solvent into a first high temperature reaction zone of a nonagitated polymerization reactor having a first high temperature reaction zone and a second low temperature reaction zone;
    (c) maintaining the temperature in said first polymerization zone by regulating the heat applied to said preheated solvent;
    (d) allowing a polymerization equilibrium to be established in said first reaction zone;
    (e) thereafter passing dissolved polymer to said low temperature zone whereby said polymer solution is confined by a chilled surface having a temperature of at least 40° F. below the reaction mass temperature wherein precipitation of said polymer from said solvent is prevented and wherein any precipitated polymer therein is returned to solution;
    (f) thereafter removing continuously the resulting solution of polymer, catalyst and solvent; and
    (g) recovering therefrom the thus formed polymer of said diene as a product of the process.
2. A process according to claim 1 wherein said diene is butadiene, said catalyst is n-butyllithium and said solvent is n-hexane.

References Cited

UNITED STATES PATENTS

| | | | |
|---|---|---|---|
| 3,074,924 | 1/1963 | Kizer et al. | 260—95 |
| 3,147,313 | 9/1964 | Hsieh | 260—94.2 |
| 2,984,657 | 5/1961 | Grundmann et al. | 260—94.9 |
| 2,993,036 | 7/1961 | Thomka et al. | 260—94.9 |
| 3,208,988 | 9/1965 | Forman et al. | 260—94.2 |

JOSEPH L. SCHOFER, *Primary Examiner.*

H. WONG, *Assistant Examiner.*